(12) United States Patent
Chen et al.

(10) Patent No.: US 11,325,277 B2
(45) Date of Patent: May 10, 2022

(54) CERAMIC PHOTOSENSITIVE RESIN BASED ANTI-PRECIPITATION THREE-DIMENSIONAL (3D) PRINTING APPARATUS

(71) Applicants: Dongguan University of Technology, Dongguan (CN); Wuxi Jingu Intelligent Technology Co., Ltd., Wuxi (CN)

(72) Inventors: Shenggui Chen, Dongguan (CN); Jiyao Zhou, Dongguan (CN); Zhenzhong Sun, Dongguan (CN); Nan Li, Dongguan (CN); Jingbo Zhu, Dongguan (CN); Bingheng Lu, Dongguan (CN)

(73) Assignees: DONGGUAN UNIVERSITY OF TECHNOLOGY, Dongguan (CN); WUXI JINGU INTELLIGENT TECHNOLOGY CO., LTD, Wuxi (CN)

(*) Notice: Subject to any disclaimer, the term of this patent is extended or adjusted under 35 U.S.C. 154(b) by 174 days.

(21) Appl. No.: 16/726,479

(22) Filed: Dec. 24, 2019

(65) Prior Publication Data
US 2020/0206971 A1  Jul. 2, 2020

(30) Foreign Application Priority Data
Dec. 26, 2018 (CN) .......................... 201811606821.4

(51) Int. Cl.
*B28B 1/00* (2006.01)
*B33Y 30/00* (2015.01)
*B29C 64/227* (2017.01)

(52) U.S. Cl.
CPC ............ *B28B 1/001* (2013.01); *B29C 64/227* (2017.08); *B33Y 30/00* (2014.12)

(58) Field of Classification Search
CPC ....... B28B 1/001; B33Y 30/00; B29C 64/227; B29C 64/218; B29C 2033/0005;
(Continued)

(56) References Cited

U.S. PATENT DOCUMENTS

2019/0263067 A1* 8/2019 Lee .......................... B29C 64/20

FOREIGN PATENT DOCUMENTS

CN           104943164 A  *  9/2015  ........... B29C 64/314

* cited by examiner

*Primary Examiner* — Leith S Shafi
*Assistant Examiner* — Tiffany Huang
(74) *Attorney, Agent, or Firm* — Harvest IP Law LLP (57) ABSTRACT

The present invention discloses a ceramic photosensitive resin based anti-precipitation three-dimensional (3D) printing apparatus, including a trough having a light transmitting area at the bottom, a projector directly below the light transmitting area, a printing platform directly above a containing cavity of the trough, a first lifting drive device for driving the printing platform into or out of the containing cavity, a lifting frame, a disturbing wheel mounted on the lifting frame and protruding downward from the lifting frame, a second lifting drive device for driving the lifting frame together with the disturbing wheel to reciprocate in the containing cavity, a rotating motor located outside the containing cavity and having an output shaft passing through the trough in a sealed manner, a friction driving wheel located in the containing cavity and mounted on the output shaft, and a friction driven wheel mounted coaxially with the disturbing wheel.

8 Claims, 5 Drawing Sheets

(58) Field of Classification Search
CPC ........ C02F 9/00; C02F 11/00; C02F 2201/00; C02F 2303/00; C02F 2307/00; B22F 10/10; B22F 3/003; B22F 3/1021; B22F 3/26; B22F 12/82; Y02P 10/25; G06F 2113/10

See application file for complete search history.

CERAMIC PHOTOSENSITIVE RESIN BASED ANTI-PRECIPITATION THREE-DIMENSIONAL (3D) PRINTING APPARATUS

CROSS-REFERENCE TO RELATED APPLICATION

This application claims priority to and the benefit of Chinese Patent Application No. 201811606821.4, filed on Dec. 26, 2018, and the disclosure of which is incorporated herein in its entirety by reference.

TECHNICAL FIELD

The present invention relates to the technical field of three-dimensional (3D) printing, and in particular, to a ceramic photosensitive resin based anti-precipitation 3D printing apparatus.

BACKGROUND

With the continuous development of economy and the continuous advancement of society, extremely rich material consumer goods are provided for people's production and life, and three-dimensional (3D) printers are one of many material consumer goods.

For continuous ascending 3D printers applied to ceramic photosensitive resins, the working process thereof is: a printing platform immersed in a trough is moved upward to a curing position of a ceramic photosensitive resin, and a lower light source is opened to make light emitted upward and pass through a light transmitting area of the trough to illuminate the printing platform, thereby photo-curing to form a photo-cured layer on the printing platform; then, the printing platform is moved upward by the height of one photo-cured layer, and the light of the light source causes the printing platform to form a new photo-cured layer, and the above steps are repeated until an entire sample is formed.

However, since the ceramic photosensitive resin is a photo-curable liquid easy to precipitate, it is extremely easy to precipitate on a bottom surface of a containing cavity of the trough; on the one hand, the light transmission of the light transmitting area is blocked; on the other hand, the density of the ceramic photosensitive resin is distributed unevenly, thereby affecting the printing quality of existing ascending 3D printers.

Therefore, a ceramic photosensitive resin based anti-precipitation 3D printing apparatus is urgently needed to overcome the above drawbacks.

SUMMARY

An objective of the present invention is to provide a ceramic photosensitive resin based anti-precipitation three-dimensional (3D) printing apparatus, which can prevent precipitation of a ceramic photosensitive resin to make the density of the ceramic photosensitive resin evenly distributed and ensure printing quality.

To achieve the above purpose, the present invention provides a ceramic photosensitive resin based anti-precipitation three-dimensional (3D) printing apparatus, comprising a trough having a light transmitting area at the bottom, a projector directly below the light transmitting area, a printing platform directly above a containing cavity of the trough, and a first lifting drive device for driving the printing platform into or out of the containing cavity, wherein the 3D printing apparatus further comprises a lifting frame, a disturbing wheel mounted on the lifting frame and protruding downward from the lifting frame, a second lifting drive device for driving the lifting frame together with the disturbing wheel to reciprocate in the containing cavity, a rotating motor located outside the containing cavity and having an output shaft passing through the trough in a sealed manner, a friction driving wheel located in the containing cavity and mounted on the output shaft, and a friction driven wheel mounted coaxially with the disturbing wheel; the lifting frame and the disturbing wheel are respectively offset from the printing platform along a length direction of the trough; when the second lifting drive device drives the lifting frame downward to a position where the friction driven wheel abuts against the friction driving wheel, the rotating motor drives the disturbing wheel to rotate through friction drive between the friction driving wheel and the friction driven wheel.

Preferably, a gap between the disturbing wheel and a bottom surface of the containing cavity when the friction driving wheel abuts against the friction driven wheel is 1 to 10 mm.

Preferably, a rotation center line of the disturbing wheel and the output shaft are both disposed along a width direction of the trough.

Preferably, the lifting frame comprises a rotating shaft and a first vertical arm and a second vertical arm spaced apart in the width direction of the trough; a first end of the rotating shaft is mounted on the first vertical arm, and a second end of the rotating shaft is mounted on the second vertical arm; the disturbing wheel is sleeved on a portion of the rotating shaft between the first vertical arm and the second vertical arm; the friction driven wheel is mounted on a portion of the second end of the rotating shaft that passes through the second vertical arm.

Preferably, the first vertical arm and the vertical second arm are parallel to each other.

Preferably, the rotating shaft and the disturbing wheel together form an integral structure.

Preferably, the friction driven wheel is aligned with the friction driving wheel along the length direction of the trough when abutting against the friction driving wheel.

Preferably, the disturbing wheel is provided with a thread groove with a notch located outside the disturbing wheel; a spiral center line of the thread groove coincides with the rotation center line of the disturbing wheel.

When a second lifting drive device drives a lifting frame downward to a position where a friction driven wheel abuts against a friction driving wheel, a rotating motor drives a disturbing wheel to rotate through friction drive between the friction driving wheel and the friction driven wheel, causing the rotating disturbing wheel to agitate a ceramic photosensitive resin in a containing cavity, thereby preventing the ceramic photosensitive resin in the containing cavity from precipitating, and evenly distributing the density of the ceramic photosensitive resin in the containing cavity to ensure printing quality; at the same time, when the second lifting drive device drives the lifting frame and the disturbing wheel to reciprocate in the containing cavity, all precipitated materials in contact with the disturbing wheel are scraped off, and an effective working range is formed in the containing cavity, thereby preventing a flowing material from precipitating during the printing process; further, a strong jet is generated at a gap between the disturbing wheel and a bottom surface of the containing cavity when the friction driving wheel abuts against the friction driven wheel, which carries away a precipitate adhered on the bottom surface of the containing cavity, thereby preventing the precipitate from covering a light transmitting area, and further ensuring printing quality.

DETAILED DESCRIPTION

In order to describe the technical contents and structural features of the present invention in detail, the following is further described with reference to the implementations and accompanying drawings.

Figure 1:
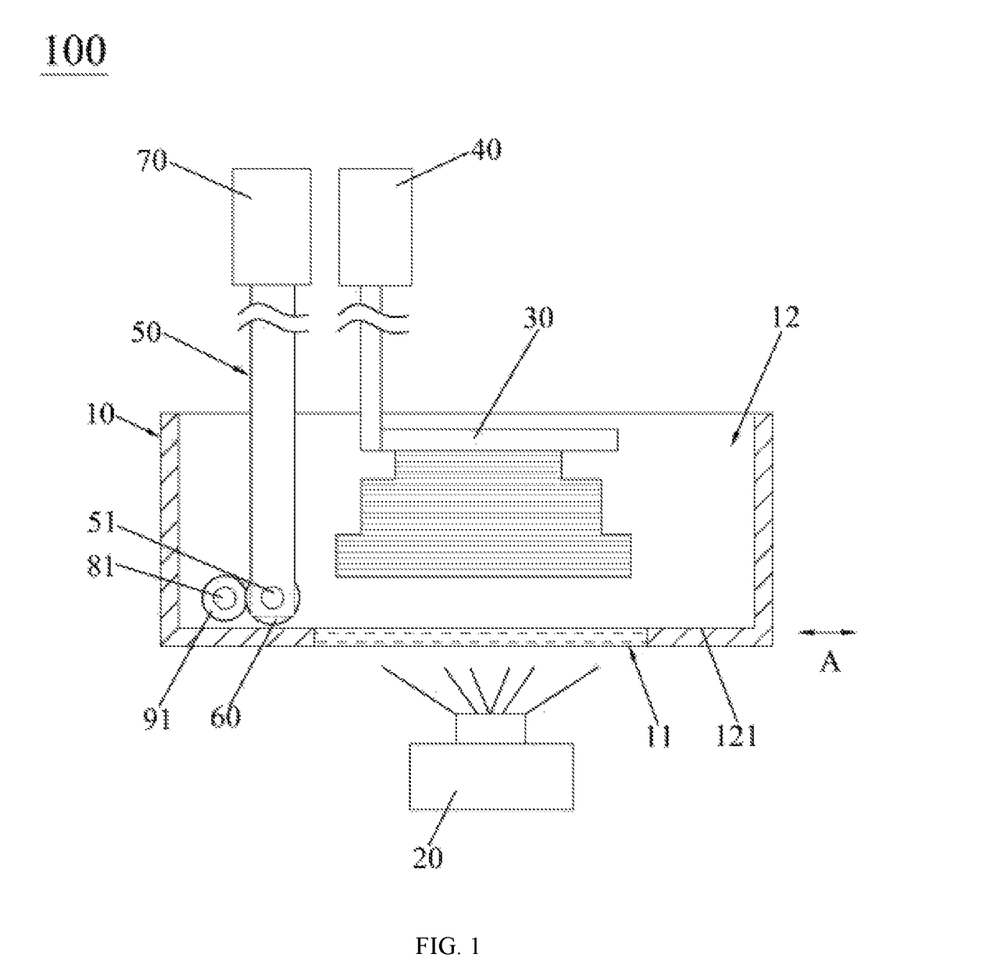
FIG. 1 is a schematic structural diagram of a three-dimensional (3D) printing apparatus viewed in a front view direction when a friction driving wheel abuts against a friction driven wheel according to a first embodiment of the present invention.
Figure 2:
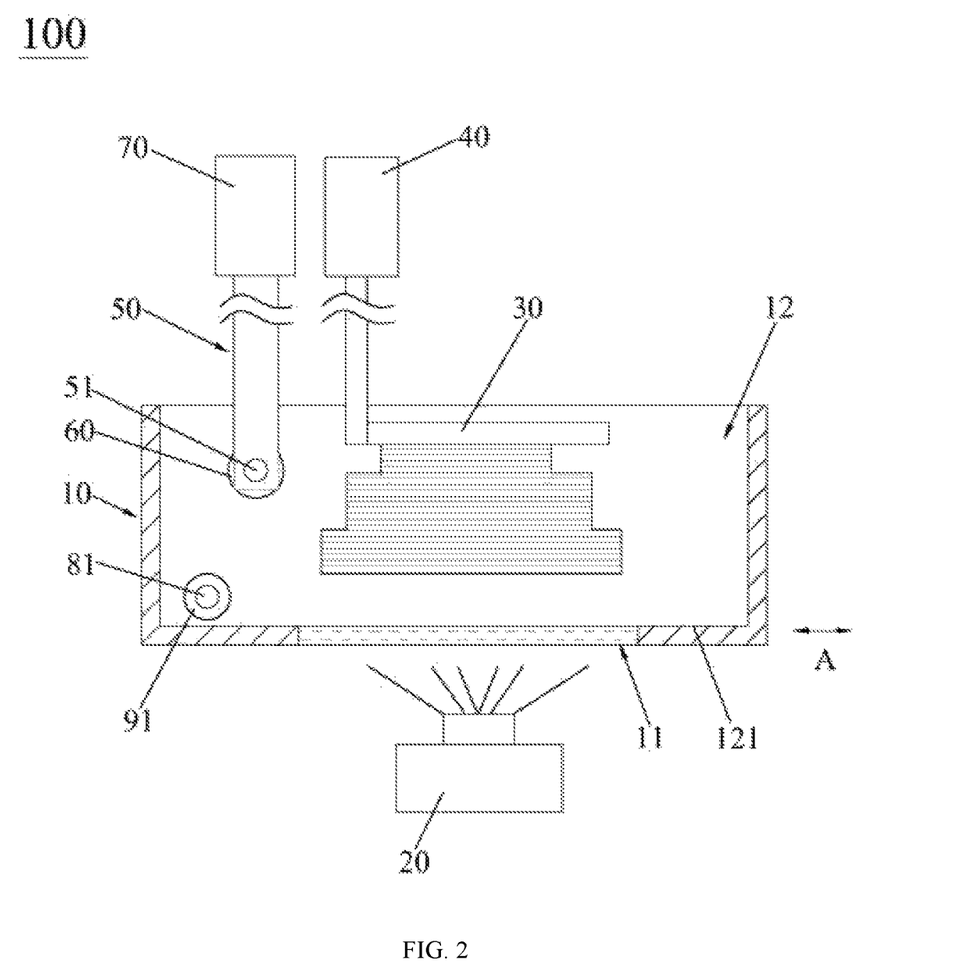
FIG. 2 is a schematic structural diagram of 3D printing apparatus viewed in a front view direction when a friction driving wheel is separated from a friction driven wheel according to a first embodiment of the present invention.
Figure 3:
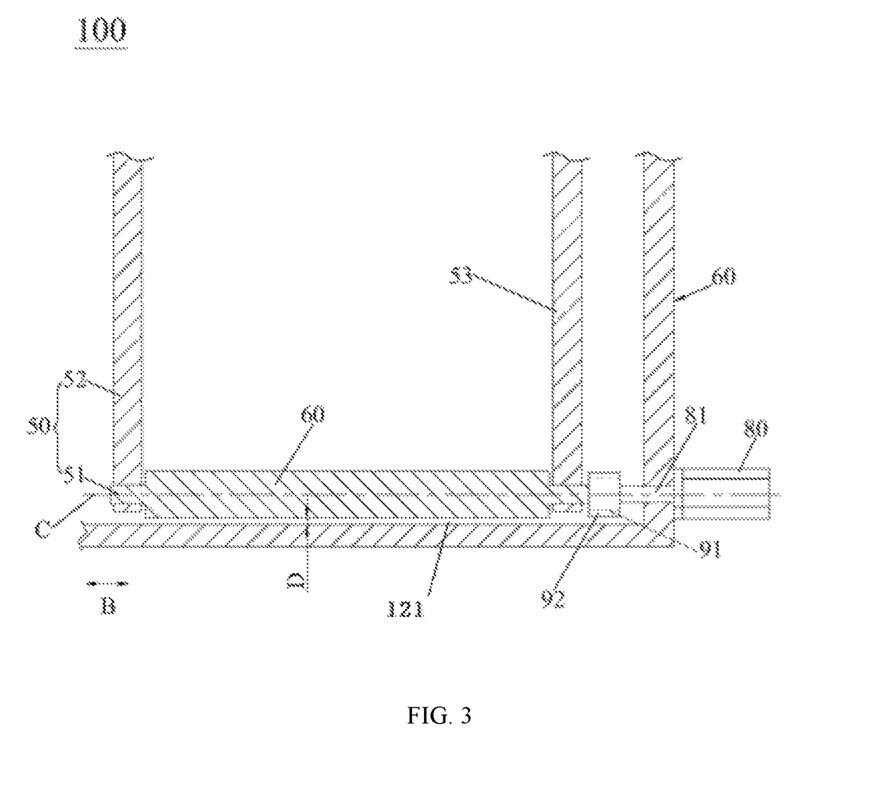
FIG. 3 is a schematic structural diagram of a 3D printing apparatus viewed in a side view direction when a friction driving wheel abuts against a friction driven wheel according to a first embodiment of the present invention.

Referring to FIG. 1 to FIG. 3, a three-dimensional (3D) printing apparatus 100 of a first embodiment includes a trough 10 having a light transmitting area 11 at the bottom, a projector 20 directly below the light transmitting area 11, a printing platform 30 directly above a containing cavity 12 in the trough 10, a first lifting drive device 40 for driving the printing platform 30 into or out of the containing cavity 12, a lifting frame 50, a disturbing wheel 60 mounted on the lifting frame 50 and protruding downward from the lifting frame 50, a second lifting drive device 70 for driving the lifting frame 50 together with the disturbing wheel 60 to reciprocate in the containing cavity 12, a rotating motor 80 located outside the containing cavity 12 and having an output shaft 81 passing through the trough 10 in a sealed manner (i.e., a fitting part between the output shaft 81 and the through 10 is sealed), a friction driving wheel 91 located in the containing cavity 12 and mounted on the output shaft 81, and a friction driven wheel 92 mounted coaxially with the disturbing wheel 60. The lifting frame 50 and the disturbing wheel 60 are respectively offset from the printing platform 30 along a length direction (i.e., a direction indicated by a double arrow A) of the trough 10, thereby preventing the lifting frame 50 and the printing platform 30 from causing interference in the lifting process; preferably, the lifting frame 50 is located on a side of the printing platform 30, but not limited thereto. When the second lifting driving device 70 drives the lifting frame 50 downward to a position where the friction driven wheel 92 abuts against the friction driving wheel 91, the rotating motor 80 drives the disturbing wheel 60 to rotate through friction drive between the friction driving wheel 91 and the friction driven wheel 92, thereby achieving the purpose of the rotation of the disturbing wheel 60. Specifically, a gap D between the disturbing wheel 60 and a bottom surface 121 of the containing cavity 12 when the friction driving wheel 91 abuts against the friction driven wheel 92 is 1 to 10 mm, such as 1 mm, 2 mm, 3 mm, 4 mm, 5 mm, 6 mm, 7 mm, 8 mm, 9 mm or 10 mm, so that when the disturbing wheel 60 is rotated, a relatively strong jet is generated at the gap D to carry away a ceramic photosensitive precipitated at the light transmitting area 11, thereby ensuring the light transmission reliability of the light transmitting area 11, but not limited thereto. Specifically, the area of the light transmitting area 11 is larger than the area of the printing platform 30 to ensure that light generated by the projector 20 passes through the light transmitting area 11 to illuminate an entire surface of the printing platform 30, but not limited thereto. More specifically as follows:

As shown in FIG. 3, a rotation center line C of the disturbing wheel 60 and the output shaft 81 are both disposed along a width direction of the trough 10 (i.e. a direction indicated by a double arrow B), and such disposition can reduce a space of the containing cavity 12 occupied by the disturbing wheel 60 in the length direction of the trough 10, thereby providing a sufficient lifting space for the printing platform 30, but not limited thereto.

As shown in FIG. 3, the lifting frame 50 includes a rotating shaft 51 and a first vertical arm 52 and a second vertical arm 53 spaced apart in the width direction of the trough 10; preferably, the first vertical arm 52 and the vertical second arm 53 are parallel to each other to ensure the mounting reliability of the rotating shaft 51, but not limited thereto; a first end of the rotating shaft 51 is mounted on the first vertical arm 52, and a second end of the rotating shaft 51 is mounted on the second vertical arm 53; the disturbing wheel 60 is sleeved on a portion of the rotating shaft 51 between the first vertical arm 52 and the second vertical arm 53, so that the disturbing wheel 60 is located between the first vertical arm 52 and the second vertical arm 53, making the disturbing wheel 60 supported more reliably; the friction driven wheel 92 is mounted on a portion of the second end of the rotating shaft 51 that passes through the second vertical arm 53, to achieve the purpose of coaxial mounting of the friction driven wheel 92 and the disturbing wheel 60. Specifically, the rotating shaft 51 and the disturbing wheel 60 together form an integral structure to simplify the structure of the two; the friction driven wheel 92 is aligned with the friction driving wheel 91 along the length direction of the trough 10 when abutting against the friction driving wheel 91, and the state is shown in FIG. 1 and FIG. 2. Preferably, the disturbing wheel 60 is adjacent to the light transmitting area 11 along the length direction of the trough 10 when the friction driven wheel 92 abuts against the friction driving wheel 91, so as to further improve the effect of the jet produced at the gap D between disturbing the wheel 60 and the bottom surface 121 of the containing cavity 12, but not limited thereto.

The working principle of the 3D printing apparatus of the first embodiment is described with reference to FIG. 1 to FIG. 3: during the printing of a product by the printing platform 30 in the containing cavity 12, the second lifting drive device 70 drives the lifting frame 50 together with the disturbing wheel 60 and the friction driven wheel 92 downward until the friction driven wheel 92 abuts against the friction driving wheel 91, and the state is shown in FIG. 1; at this time, the rotating motor 80 works, and the working rotating motor 80 drives the friction driving wheel 91 to rotate, and the rotating friction driving wheel 91 drives the disturbing wheel 60 to rotate through friction drive between the friction driving wheel and the friction driven wheel 92, thereby causing the rotating disturbing wheel 60 to agitate the ceramic photosensitive resin in the containing cavity 12; when the second lifting drive device 70 drives the lifting frame 50 together with the disturbing wheel 60 and the friction driven wheel 92 upward away from the friction driving wheel 91, the rotating motor 80 can continue to work or stop working, and the rotating motor 80 that continues to work drives the friction driving wheel 91 to rotate; therefore, the rotating friction driving wheel 91 has a certain agitating effect on the ceramic photosensitive resin in the containing cavity 12. When the second lifting drive device 70 drives the lifting frame 50 together with the disturbing wheel 60 and the friction driven wheel 92 upward away from the friction driving wheel 91 in place, the state being shown in FIG. 2, the second lifting drive device 70 drives the lifting frame 50 together with the disturbing wheel 60 and the friction driven wheel 92 downward; the above process is repeated to achieve the purpose that the second lifting drive device 70 drives the lifting frame 50 together with the disturbing wheel 60 and the friction driven wheel 92 to reciprocate in the containing cavity 12.

Figure 4:
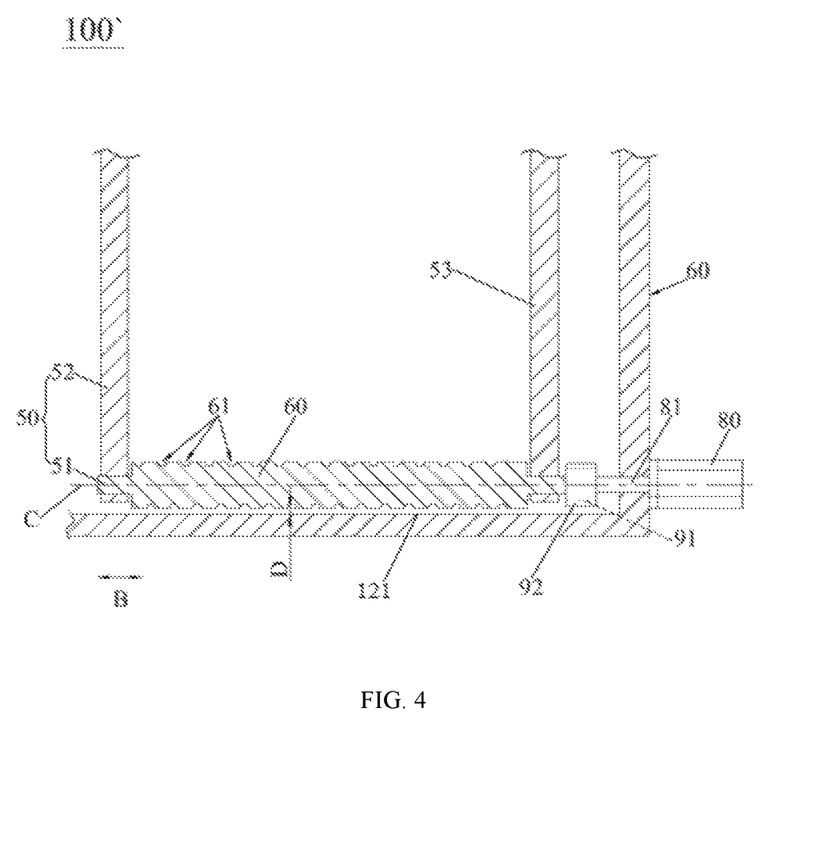
FIG. 4 is a schematic structural diagram of a 3D printing apparatus viewed in side view direction when a friction driving wheel abuts against a friction driven wheel according to a second embodiment of the present invention.
Figure 5:
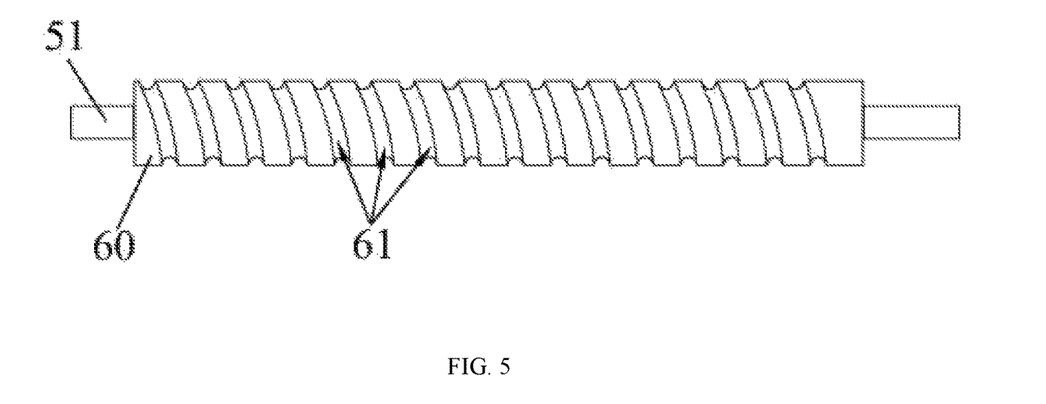
FIG. 5 is a schematic structural diagram showing that a disturbing wheel and a rotating shaft of a 3D printing apparatus shown in FIG. 4 are assembled together.

Referring to FIG. 4 and FIG. 5, a second embodiment of a 3D printing apparatus of the present invention is illustrated. The 3D printing apparatus 100' of this embodiment has substantially the same structure as the 3D printing apparatus 100 of the first embodiment, except that, the disturbing wheel 60 of the second embodiment is provided with a thread groove 61 with a notch located outside the disturbing wheel 60; a spiral center line of the thread groove 61 coincides with the rotation center line of the disturbing wheel 60, so that the ceramic photosensitive resin in the containing cavity 12 flows and is rotated along the thread groove 61 of the disturbing wheel 60 that performs a rotational motion, and the agitation effect is further improved, thereby effectively improving the anti-precipitation effect, improving the evenness of sealed distribution of the ceramic photosensitive resin, and thus ensuring printing quality.

Except the above difference, the other is the same as the first embodiment, and thus will not be described again.

When the second lifting drive device 70 drives the lifting frame 50 downward to a position where the friction driven wheel 92 abuts against the friction driving wheel 91, the rotating motor 80 drives the disturbing wheel 60 to rotate through friction drive between the friction driving wheel 91 and the friction driven wheel 92, causing the rotating disturbing wheel 60 to agitate the ceramic photosensitive resin in the containing cavity 12, thereby preventing the ceramic photosensitive resin from precipitating in the containing cavity 12, and evenly distributing the density of the ceramic photosensitive resin in the containing cavity 12 to ensure printing quality; at the same time, when the second lifting drive device 70 drives the lifting frame 50 and the disturbing wheel 60 to reciprocate in the containing cavity 12, all precipitated materials in contact with the disturbing wheel 60 are scraped off, and an effective working range is formed in the containing cavity 12, thereby preventing a flowing material from precipitating during the printing process; further, a strong jet is generated at the gap between the disturbing wheel 60 and the bottom surface 121 of the containing cavity 12 when the friction driving wheel 91 abuts against the friction driven wheel 92, which carries away a precipitate adhered on the bottom surface 121 of the containing cavity 12, thereby preventing the precipitate from covering the light transmitting area 11, and further ensuring printing quality.

It should be noted that, the specific structure in which the first lifting drive device 40 drives the printing platform 30 upward and downward and the specific structure in which the second lifting drive device 70 drives the lifting frame 50 upward and downward, for example, driving by the cooperation of a lead screw and a screw nut, or driving by the cooperation of a synchronous belt wheel and a synchronous belt, are well known in the art, and will not be described here.

The above disclosed is only preferred embodiments of the present invention, and are not intended to limit the claimed scope of the present invention. Therefore, equivalent changes made according to the claims of the present invention are still within the scope of the present invention.

What is claimed is:

1. A ceramic photosensitive resin based anti-precipitation three-dimensional (3D) printing apparatus, comprising
   a trough having a light transmitting area at the bottom,
   a projector directly below the light transmitting area,
   a printing platform directly above a containing cavity of the trough, and
   a first lifting drive device for driving the printing platform into or out of the containing cavity,
   wherein the 3D printing apparatus further comprises
   a lifting frame,
   a disturbing wheel mounted on the lifting frame and protruding downward from the lifting frame,
   a second lifting drive device for driving the lifting frame together with the disturbing wheel to reciprocate in the containing cavity,
   a rotating motor located outside the containing cavity and having an output shaft passing through the trough in a sealed manner,
   a friction driving wheel located in the containing cavity and mounted on the output shaft, and
   a friction driven wheel mounted coaxially with the disturbing wheel;
   the lifting frame and the disturbing wheel are respectively offset from the printing platform along a length direction of the trough;
   when the second lifting drive device drives the lifting frame downward to a position where the friction driven wheel abuts against the friction driving wheel, the rotating motor drives the disturbing wheel to rotate through friction drive between the friction driving wheel and the friction driven wheel.

2. The 3D printing apparatus according to claim 1, wherein a gap between the disturbing wheel and a bottom surface of the containing cavity when the friction driving wheel abuts against the friction driven wheel is 1 to 10 mm.

3. The 3D printing apparatus according to claim 1, wherein a rotation center line of the disturbing wheel and the output shaft are both disposed along a width direction of the trough.

4. The 3D printing apparatus according to claim 3, wherein the lifting frame comprises a rotating shaft and a first vertical arm and a second vertical arm spaced apart in the width direction of the trough; a first end of the rotating shaft is mounted on the first vertical arm, and a second end of the rotating shaft is mounted on the second vertical arm; the disturbing wheel is sleeved on a portion of the rotating shaft between the first vertical arm and the second vertical arm; the friction driven wheel is mounted on a portion of the second end of the rotating shaft that passes through the second vertical arm.

5. The 3D printing apparatus according to claim 4, wherein the first vertical arm and the vertical second arm are parallel to each other.

6. The 3D printing apparatus according to claim 4, wherein the rotating shaft and the disturbing wheel together form an integral structure.

7. The 3D printing apparatus according to claim 1, wherein the friction driven wheel is aligned with the friction driving wheel along the length direction of the trough when abutting against the friction driving wheel.

8. The 3D printing apparatus according to claim 1, wherein the disturbing wheel is provided with a thread groove with a notch located outside the disturbing wheel; a spiral center line of the thread groove coincides with the rotation center line of the disturbing wheel.

* * * * *